(12) United States Patent
Levi (10) Patent No.: US 11,975,689 B2
(45) Date of Patent: May 7, 2024

(54) EQUIPMENT ROOF RACK

(71) Applicant: Avraham Y. Levi, Eagan, MN (US)

(72) Inventor: Avraham Y. Levi, Eagan, MN (US)

(*) Notice: Subject to any disclaimer, the term of this patent is extended or adjusted under 35 U.S.C. 154(b) by 140 days.

(21) Appl. No.: 17/856,921

(22) Filed: Jul. 1, 2022

(65) Prior Publication Data
US 2024/0001858 A1 Jan. 4, 2024

(51) Int. Cl.
*B60R 9/042* (2006.01)

(52) U.S. Cl.
CPC ............ *B60R 9/0423* (2013.01); *B60R 9/042* (2013.01)

(58) Field of Classification Search
CPC .............................. B60R 9/042; B60R 9/0423
USPC .......................................... 224/310; 414/462
See application file for complete search history.

(56) References Cited

U.S. PATENT DOCUMENTS

| | | | |
|---|---|---|---|
| 5,297,912 A | 3/1994 | Levi | |
| 6,092,972 A | 7/2000 | Levi | |
| 6,099,231 A | 8/2000 | Levi | |
| 6,427,889 B1 | 8/2002 | Levi | |
| 6,764,268 B2 * | 7/2004 | Levi | B60R 9/0423 224/310 |
| 7,780,050 B2 * | 8/2010 | Tucker | B60R 9/042 224/310 |
| 9,415,726 B2 * | 8/2016 | Levi | B60R 9/0485 |
| 10,486,608 B2 * | 11/2019 | Levi | A62C 33/04 |
| 10,501,022 B1 * | 12/2019 | Levi | B60R 9/0423 |
| 10,647,262 B2 * | 5/2020 | Müller | B60R 9/042 |
| 10,654,420 B2 * | 5/2020 | Levi | B60P 3/40 |
| 11,820,332 B2 * | 11/2023 | Cummins | B60R 9/042 |
| 2023/0082917 A1 * | 3/2023 | Guo | B60R 9/042 414/812 |

FOREIGN PATENT DOCUMENTS

| | | | | |
|---|---|---|---|---|
| FR | 2936989 A1 * | 4/2010 | ............ | B60R 9/042 |
| GB | 2468660 A * | 9/2010 | ............ | B60R 9/042 |

* cited by examiner

*Primary Examiner* — Justin M Larson
(74) *Attorney, Agent, or Firm* — Brad J. Thorson; DeWitt LLP (57) ABSTRACT

Transport of ladders and other pieces of equipment, such as those used by fire fighters, is added by a motor-powered rack comprising a ramp assembly that moves between a loading position adjacent to and at an angle of between 20 and 70 degrees to the ground and a stowed position above a vehicle used for transport and generally parallel to the ground.

16 Claims, 11 Drawing Sheets

EQUIPMENT ROOF RACK

CROSS REFERENCE TO RELATED APPLICATIONS

None.

STATEMENT OF GOVERNMENT SPONSORSHIP

None

BACKGROUND OF THE INVENTION

I. Field of the Invention

This invention relates generally to equipment racks mountable on the roof of a motor vehicle, such as a fire truck, for transporting one or more ladders and other equipment, and more particularly to the construction of such racks adapted to alleviate the stress and strain on fire fighters or others when stowing ladders and other equipment for transport and when retrieving such ladders and equipment for use.

II. Discussion of the Prior Art

Work vehicles often incorporate a roof rack adapted to support cargo of one type or another to be used at a work site. In the case of fire trucks, such cargo often includes ladders and other equipment used by fire fighters to deal with emergency situations. The ladders used by fire fighter tend to be particularly heavy given their length and duty rating, i.e., the weight they are required to carry. The other equipment fire fighters need to transport to do their life and property saving work also tends to be quite heavy.

Storage of such ladders and other equipment above the roof of a fire truck is made more difficult because of the height of the fire truck. Fire trucks tend to be nine to twelve feet tall while the height of a fire fighter is typically less than six feet tall. Climbing on the roof is not recommended due to fall danger. Further, fire trucks are designed for quick ingress and egress by fire fighters and contain various storage compartments that must be quickly accessed to retrieve needed equipment stored therein. Roof racks for fire trucks need to be designed so that there is minimal blockage of ingress and egress points and such compartments.

U.S. Pat. Nos. 5,297,912; 6,092,972; 6,099,231; and 6,427,889, the teachings of which are hereby incorporated by reference, described different designs of truck or van-mounted ladder racks that facilitate the loading and unloading of one or more ladders with respect to the vehicle's roof. These devices comprise front and rear four-bar linkage assemblies that include a stationary member which is adapted to rigidly affixed to the vehicle's roof or to cross-members that clamp to the vehicle's roof, and a ladder support member pivotally joined to the stationary member by a pair of transversely spaced links. A drive shaft is journaled for rotation in the stationary members of the front and rear four-bar linkage assemblies and is rigidly affixed to one of the pair of links of the front and rear four-bar linkage assemblies. Thus, when the drive shaft is rotated, either manually with a crank or automatically by means of a motor, ladders resting on the front and rear ladder support members are lifted and rotated from a position parallel to the vehicle's roof to a position parallel to the vehicle's side during an unloading maneuver. When reloading ladders onto the vehicle, the drive shaft is rotated in an opposite direction to raise and rotate the ladder load onto the vehicle's roof.

In these earlier designs described in the aforementioned patents, the four-bar linkages have been designed such that the top and foot of the ladders remain generally horizontal throughout their range of motion as the drive shaft is rotated.

While the earlier designs reflected in the above-listed patents greatly simplify the loading and unloading of ladders onto and from transport vehicles, improvements are required to permit storage of the ladders and equipment used by fire fighters. The present invention provides such improvements.

SUMMARY OF THE INVENTION

In accordance with the present invention there is provided a roof top equipment rack for work vehicles, such as fire trucks. The roof top equipment rack comprises a base assembly coupled to the roof of the vehicle. Two gear motors are mounted to the base assembly, one on each side across the back of the base. A keyed shaft is extending between the gears across the base. A carriage assembly is pivotally mounted to the shaft. The carriage includes right and left roller guides and drive sprocket assemblies keyed to the shaft. A slide frame assembly includes a first channel and a second channel, riding on the carriage roller guides. The slide frame assembly has a first elongate member and a second elongate member joined together by cross members. The elongated members are guided by the carriage roller guides, and slide along the rack. Two actuator assemblies are provided as part of the roof top equipment rack, one on each side of the base. Each actuator assembly controls and assists with movement of the slide frame assembly relative to the carriage and base assembly between a loading position and a stowed position. The stowed position of the slide frame assembly is above the frame and generally parallel to the base and the ground beneath the vehicle. When the slide frame assembly is in the loading position, the slide frame assembly is proximal to the base assembly and at an angle of between 20 degrees and 70 degrees relative to the base-assembly and the ground. This permits ladders to be laid on and pushed up the slide frame assembly for loading and avoids the need for a fire fighter or other person to lift the ladder onto a rooftop rack.

The actuator assembly includes various features. These include first and second sliders each having a proximal position and a distal position. The first slider is adapted to slide along the first slider guide attached to the base assembly between the first slider's proximal position and distal position. The second slider is adapted to slide along the second slider guide attached to the base between the second slider's proximal position and distal position. In some embodiments the actuator assembly includes first and second springs, such as gas springs, residing in the first and second channels of the slider guides mounted on the base assembly. These first and second springs, when provided, are adapted to bias the first slider and the second slider toward their proximal positions.

The actuator assembly also includes first and second ramp guides. The first ramp guide is pivotally coupled to the first slider and to a first end of a first arm. The second end of the first arm is pivotally coupled to the first slider guide. Similarly, the second ramp guide is pivotally coupled to the second slider and to a first end of a second arm. The second end of the second arm is pivotally coupled to the second slider guide. First and second guide wheels are also included as parts of the actuator assembly. The first guide wheel resides in the first ramp guide and is coupled to the first elongate member of the slide frame assembly by a bracket at a first predetermined position along the first elongate member. The second guide wheel resides in the second ramp guide and is coupled to the second elongate member of the slide frame assembly by a bracket at a second predetermined position. These wheels are adapted to roll back and forth in a controlled manner along the respective ramp guides. Two guide wheel stops associated with each of the first and second ramp guides will typically be mounted to the ramp guide, one at each end, to keep the guide wheels from exiting the ramp guides. When driving the slide frame to the stowed position, each guide wheel in the ramp guide pushes the slider to the slider distal position and causes the ramp guide driven to be parallel with the slider guide. When driving the slide frame to the loading position, the ramp guides will cause the slider to the proximal position, controlling the slide frame and carriage assembly angle to the loading position.

The actuator assembly may further include first and second carriages with the first carriage is adapted for reciprocating motion relative to the first elongate frame member, and the second carriage adapted for reciprocating motion relative to the second elongate frame member. The carriages may each be equipped with a plurality of slide wheels to foster such reciprocating motion. The actuator assembly may be of either a single or a dual motor configuration. In single motor configuration the keyed shaft is supported by the gear motor on one side, and by an idler on the other side. In either case, the carriage assembly is equipped with one or plural gear trains and, in some embodiments, a pair of idlers in each gear train. An elongate driven member, having opposing end portions coupled to the slide frame assembly is provided with each included gear train. This elongate driven member can be a belt with teeth like a timing belt or a chain with links like a timing chain. In any case, the elongate drive member is adapted to mesh with a gear of the gear train. In a dual motor configuration, a second elongate drive member adapted to mesh with a gear of the second gear train referenced above is provided and operated in a similar manner.

As suggested above, either one or two motors may be provided. The motor(s) are coupled to the base assembly and are operatively coupled to the gear train(s) by a keyed shaft and adapted to selectively rotate the gears of the gear train(s) so the output gear of the gear train(s) rotates in both a selectable first direction and a selectable second direction. Rotation of the output gear(s) in the first direction causes the slide frame assembly to move into the stowed position described above. Rotation of the output gear(s) in the second direction moves the slide frame assembly into the loading position described above. The assembly may also include a plurality of guide wheel stops associated with each of the first and second ramp guides to ensure the wheels do not exit the ramp guides.

DESCRIPTION OF THE DRAWINGS

The foregoing features, objects and advantages of the invention will become apparent to those skilled in the art from the following detailed description of a preferred embodiment, especially when considered in conjunction of the accompanying drawings in which like numerals in the several views refer to corresponding parts.

DESCRIPTION OF THE PREFERRED EMBODIMENTS

This description of the preferred embodiments is intended to be read in connection with the accompanying drawings, which are to be considered part of the entire written description of this invention. In the description, relative terms such as "lower", "upper", "horizontal", "vertical", "above", "below", "up", "down", "top" and "bottom" as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise.

Figure 1:
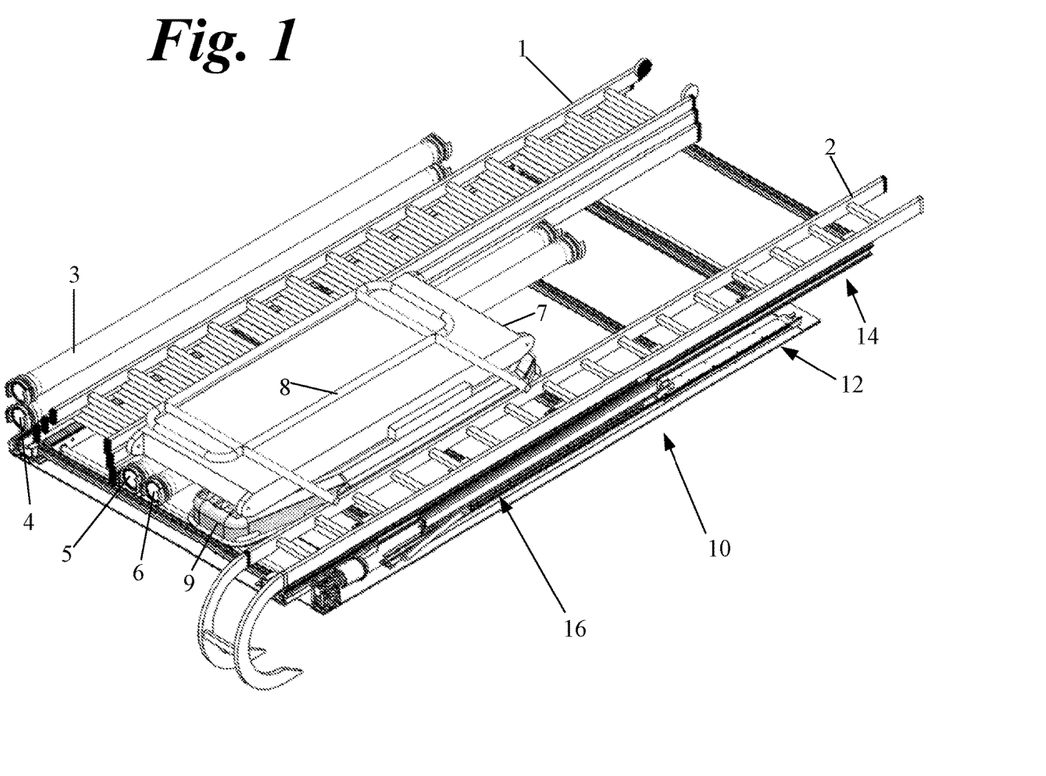
FIG. 1 is a perspective view of an equipment rack made in accordance with the present invention with the slide frame assembly loaded with ladders and other equipment and in its stowed position.
Figure 2:
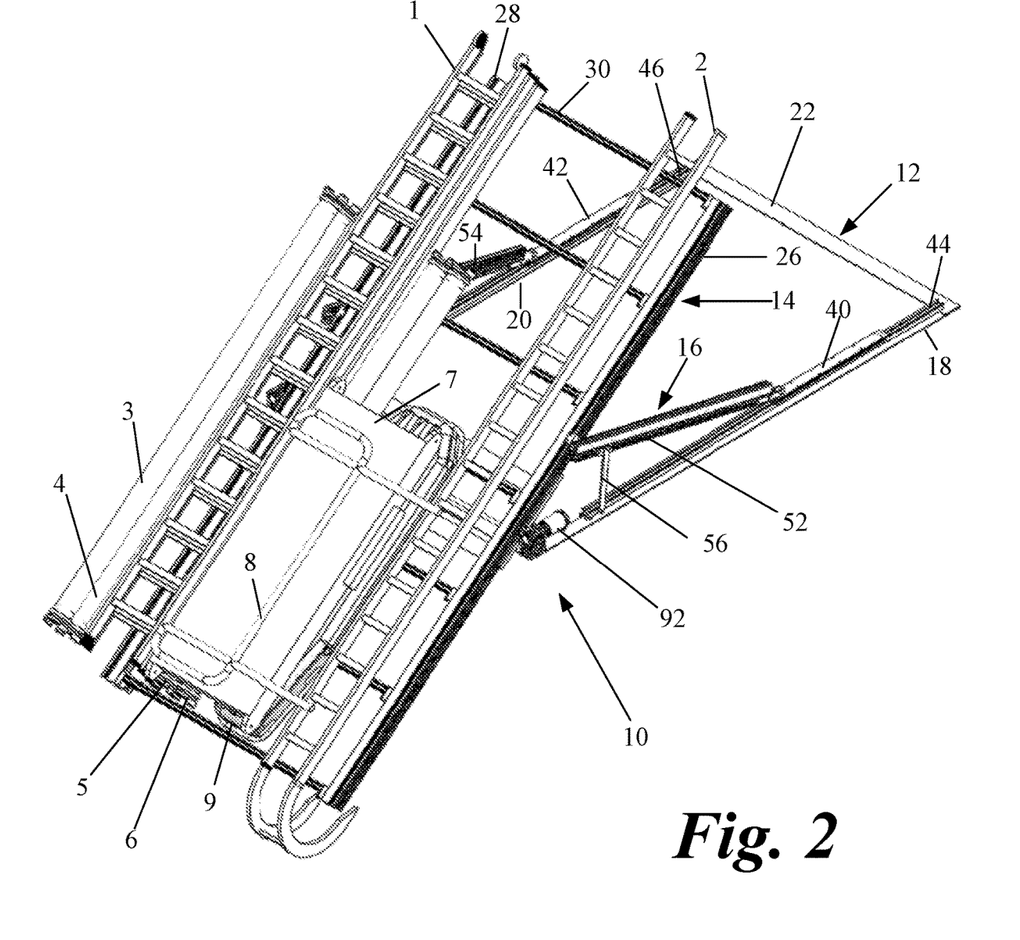
FIG. 2 is a perspective view of the equipment rack of FIG. 1 with the slide frame assembly loaded with ladders and other equipment and in its loading position.

As shown in FIGS. 1 and 2, the equipment rack 10 of the present invention is adapted to carry various pieces of equipment and move that equipment from a stowed position shown in FIG. 1 to a loading position shown in FIG. 2. Such equipment may include, without limitation, several ladders 1 and 2, several hoses 3, 4, 5, and 6, scaffolding 7, a safety rail 8, and body boards 9. The equipment rack 10 is ideally suited to be mounted to the roof of a work vehicle such as a fire truck which transports equipment stored on the rack 10 when the ramp assembly of the equipment rack is in the stowed configuration shown in FIG. 1. Equipment is easily loaded onto the rack 10 when in the loading configuration shown in FIG. 2.

Figure 3:
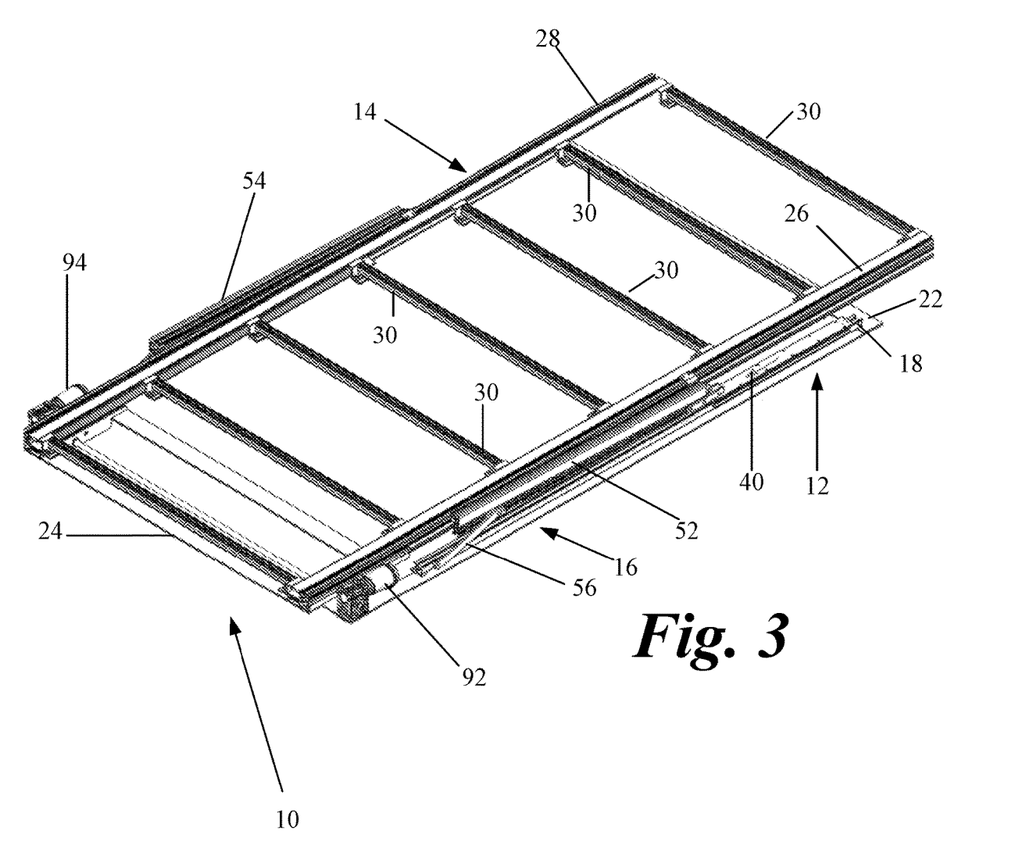
FIG. 3 is a perspective view of the equipment rack of FIG. 1 with the slide frame assembly empty and in its stowed position.
Figure 4:
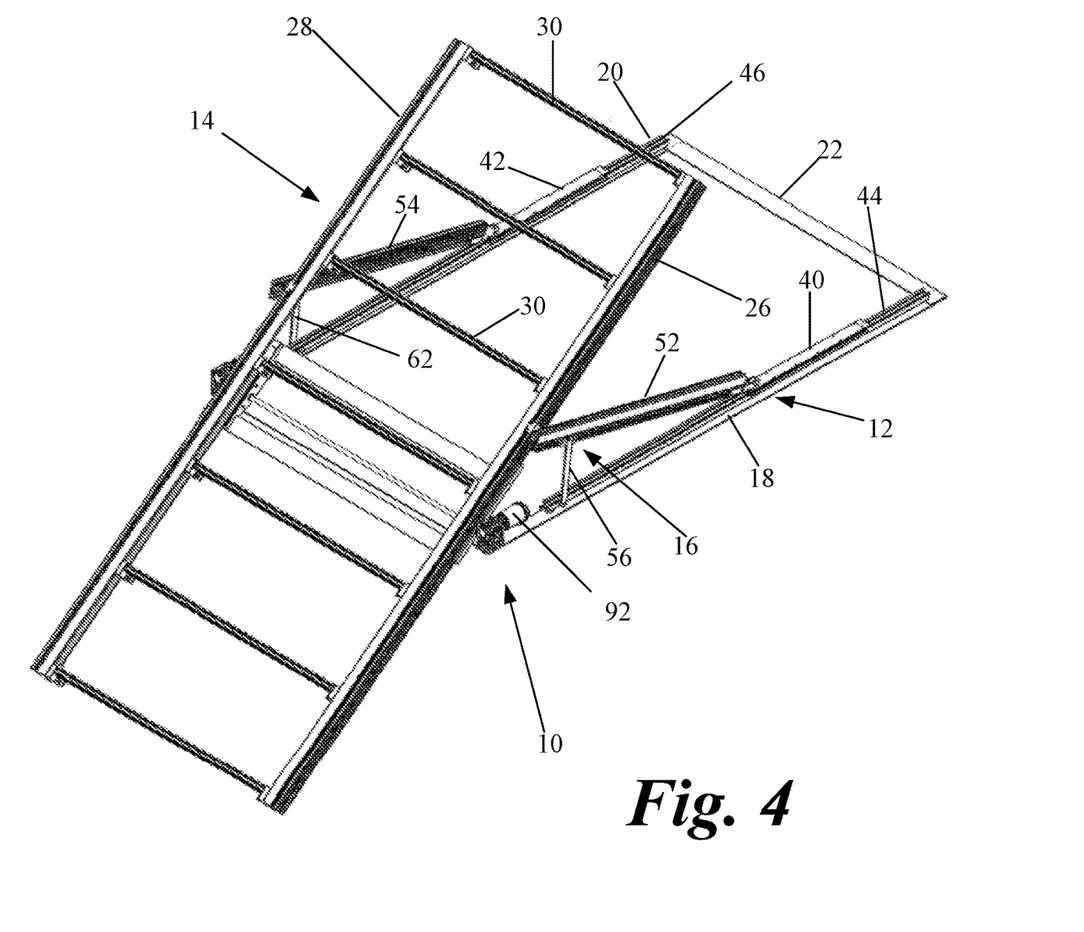
FIG. 4 is a perspective view of the equipment rack of FIG. 1 with the slide frame assembly empty and in its loading position.
Figure 5:
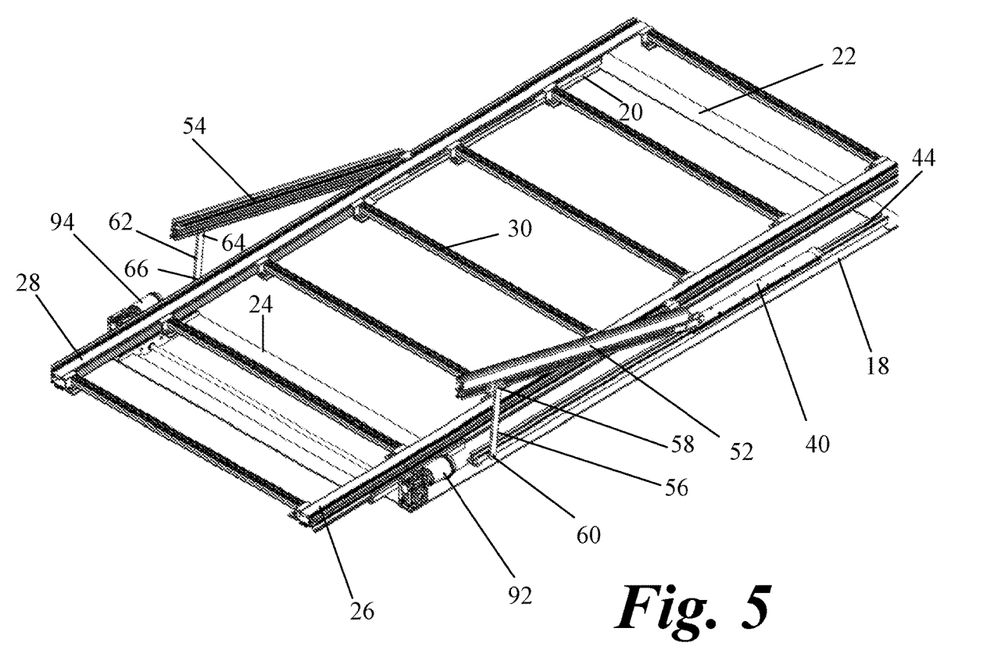
FIG. 5 is a perspective view of the equipment rack of FIG. 1 with the slide frame assembly empty and in a transition position between the stowed and the loading position.
Figure 6:
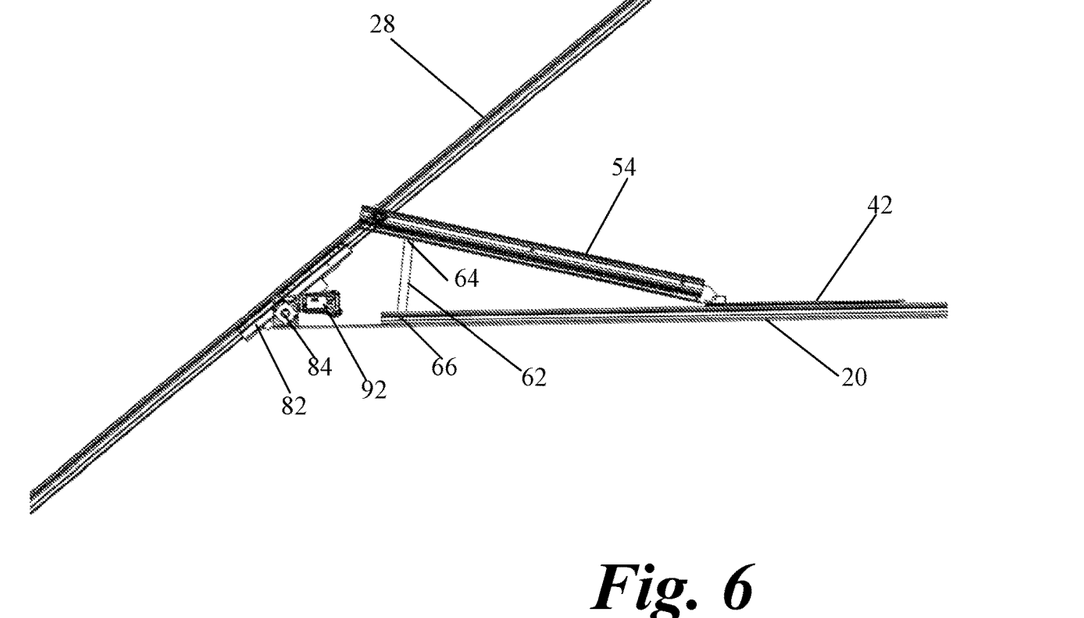
FIG. 6 is a side view showing a first side of the equipment rack of FIG. 1 with the slide frame assembly empty and in its loading position.
Figure 7:
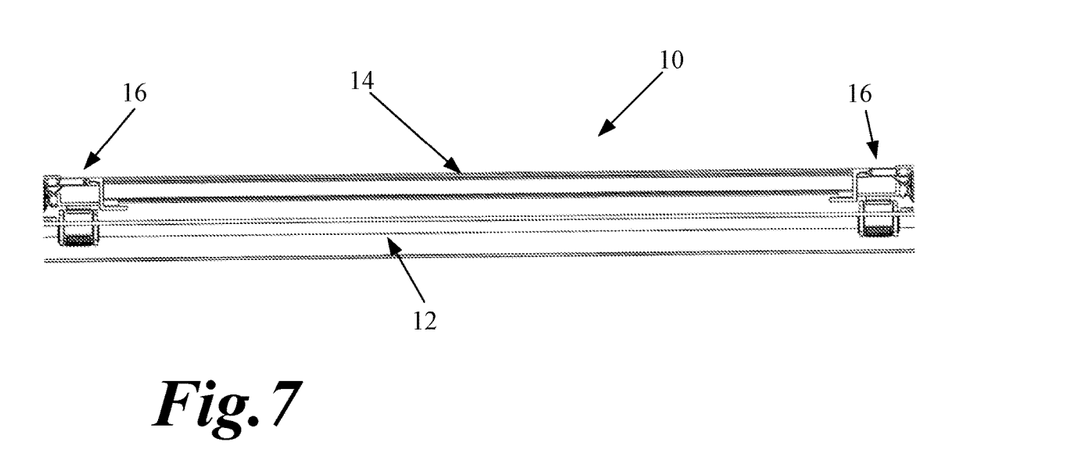
FIG. 7 is a front view of the equipment rack of FIG. 1 with the slide frame assembly empty and in its stowed position.
Figure 8:
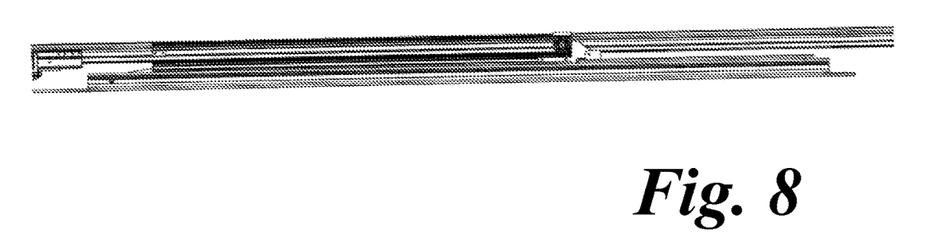
FIG. 8 is a side view of a first side of the equipment rack of FIG. 1 with the slide frame assembly empty and in its stowed position.
Figure 9:
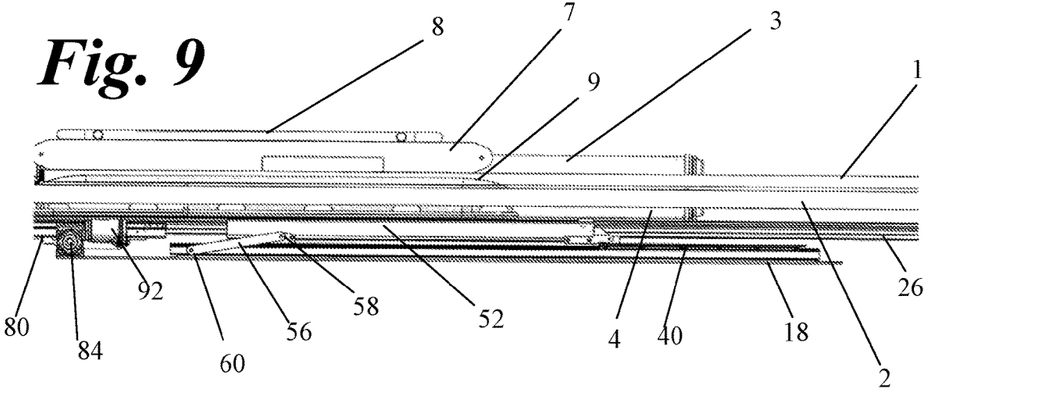
FIG. 9 is a side view of a first side of the equipment rack of FIG. 1 with the slide frame assembly loaded with equipment and in its stowed position.
Figure 10:
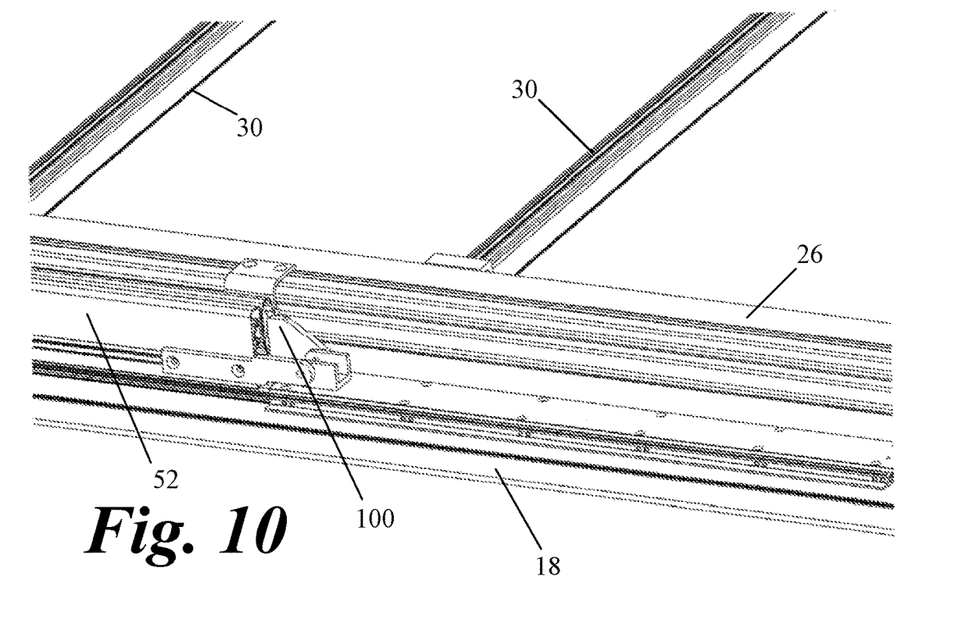
FIG. 10 is a partial perspective view showing the connection between the slider and ramp guide of a first side of the equipment rack of FIG. 1.

FIGS. 3 and 4 show the overall construction of the equipment rack 10 with no equipment loaded on the rack. Generally, the equipment rack 10 comprising a base assembly 12, a slide frame assembly 14, and an actuator assembly 16. The base assembly 12 includes a first channel or elongate member 18, a second channel or elongate member 20, and may include cross members 22 and 24. The base assembly is adapted to be connected to the roof of a vehicle such as a fire truck (not shown). However, the base assembly 12 may be coupled to other structures without deviating from the invention.

As shown, the slide frame assembly 14 includes a first elongate guide member 26 and a second elongate guide member 28. The elongate guide members 26 and 28 are joined and held in generally parallel and spaced relation by a plurality of spaced apart connecting members 30. Ladders and other equipment may be fastened to these connecting members 30 using bungee cords, clamps, and other fasteners not shown in the drawings because they are well-known to those of ordinary skill in the art.

The actuator assembly 16 comprises various elements cooperating to move the slide frame assembly 14 relative to the base assembly 12 between the stowed position shown in FIGS. 1 and 3 and the loading position shown in FIGS. 2 and 4.

Figure 11:
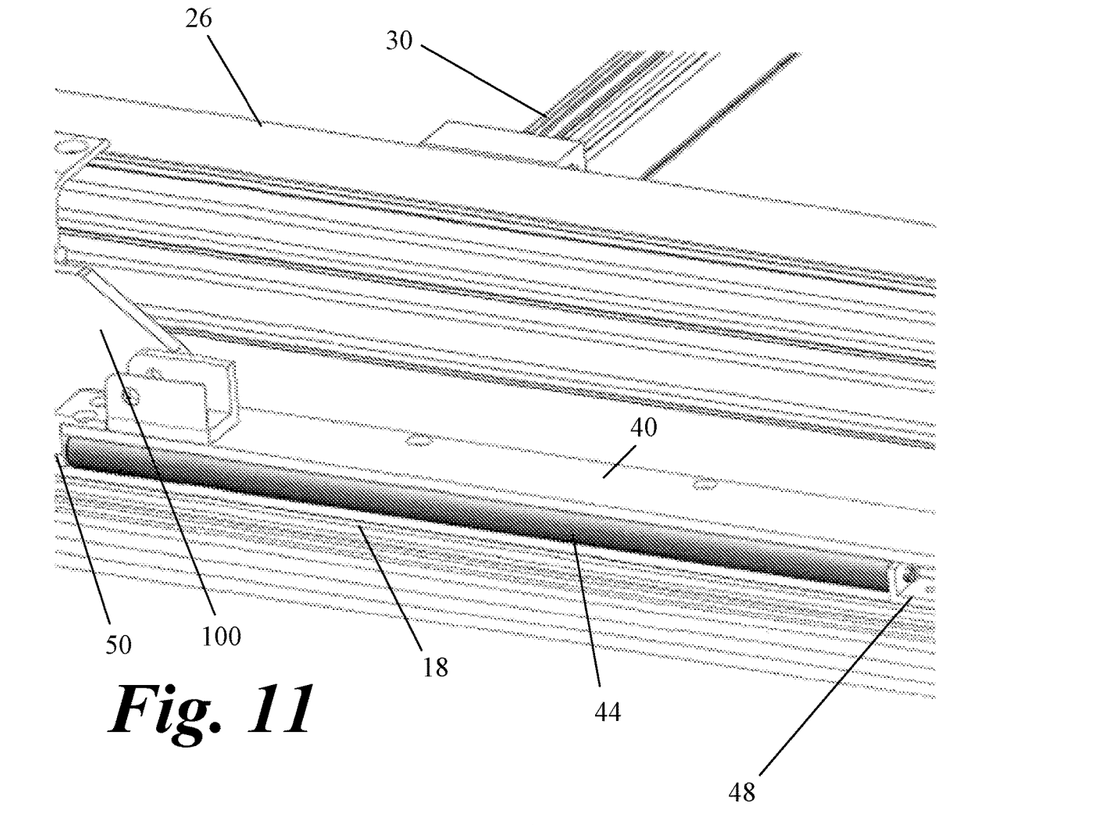
FIG. 11 is a partial perspective view showing a gas spring positioned in the slider guides channel of a second side of the equipment rack of FIG. 1 and how the gas spring is coupled to the channel and the slider to bias the slider toward its proximal position.
Figure 12:
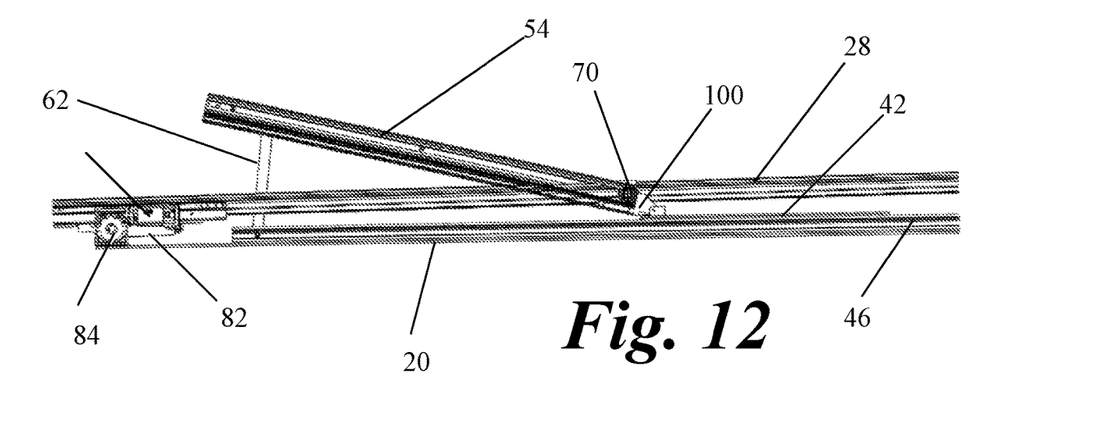
FIG. 12 is a partial perspective view of a second side of the equipment rack of FIG. 1 showing ramp assembly in an intermediate position between the stowed position and the loading position with a ramp guide elevated and the slider in its proximal position.
Figure 13:
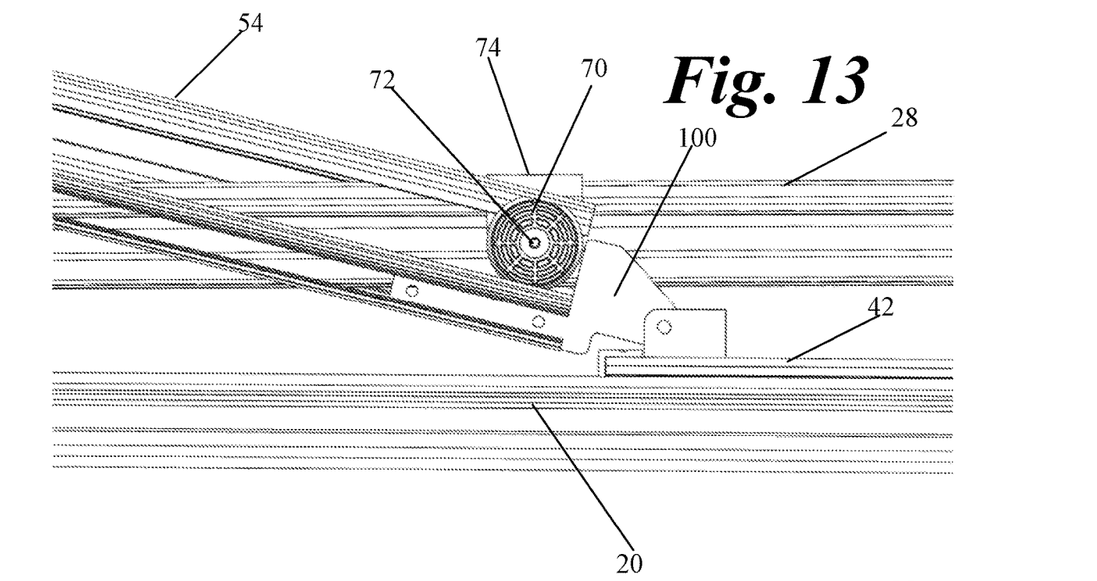
FIG. 13 is a second partial perspective of the equipment rack of FIG. 1 showing ramp assembly in an intermediate position between the stowed position and the loading position with a ramp guide elevated and the slider in its proximal position.
Figure 14:
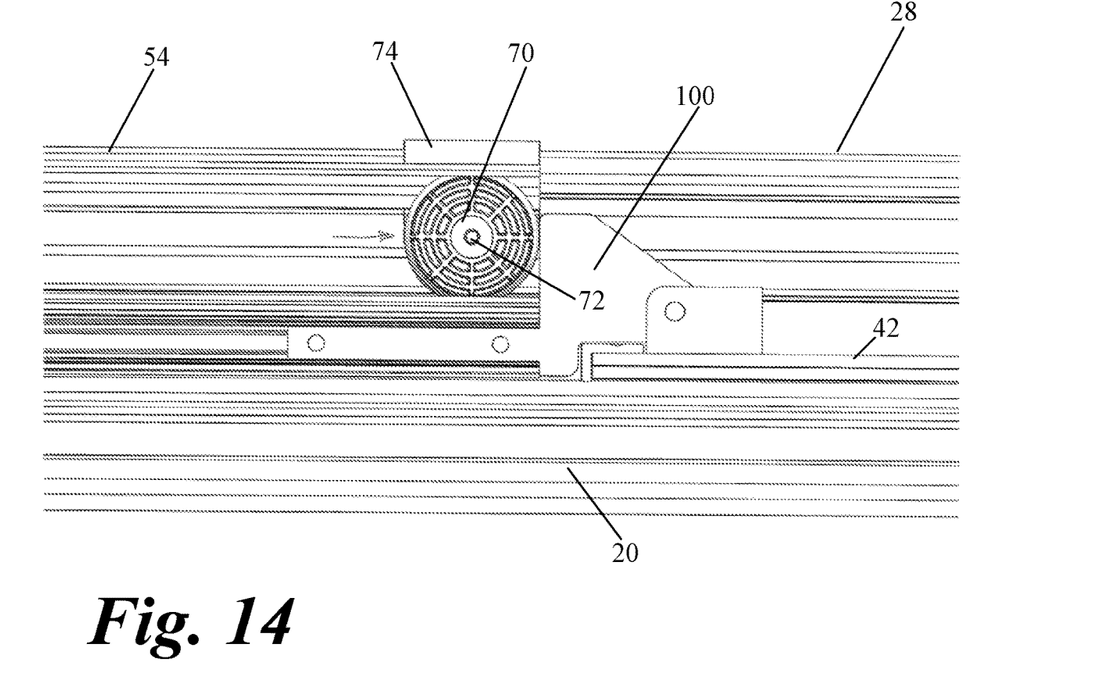
FIG. 14 is a third partial perspective view of the equipment rack of FIG. 1 showing a guide wheel positioned in a ramp guide, a stop for preventing the guide wheel from exiting the ramp guide, and the slider in its distal position.
Figure 15:
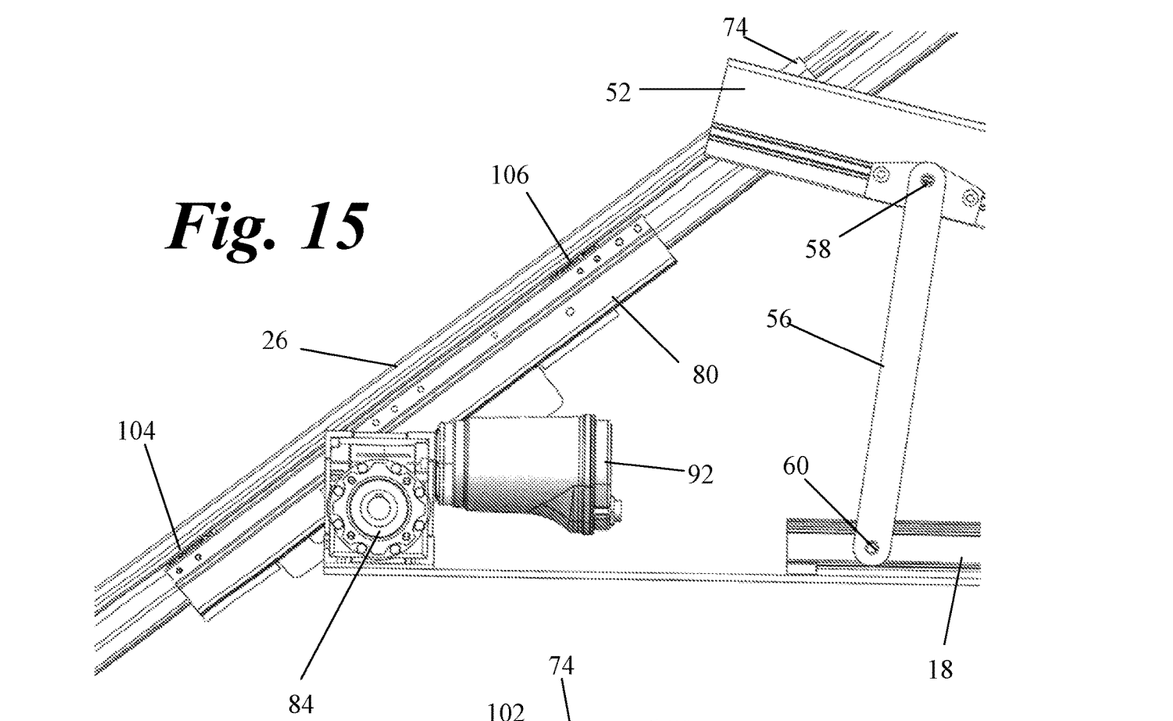
FIG. 15 is a partial side view of a first side of the equipment rack of FIG. 1 showing the slide frame assembly in it loading position.
Figure 16:
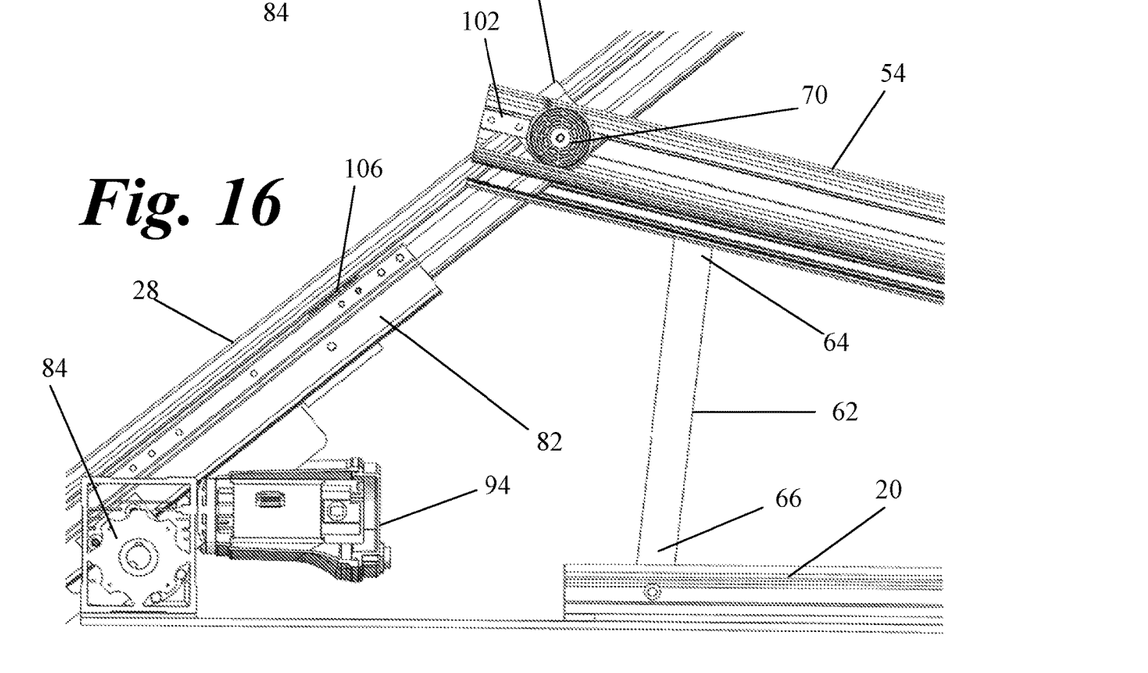
FIG. 16 is a partial side view of a second side of the equipment rack of FIG. 1 showing the slide frame assembly in it loading position.
Figure 17:
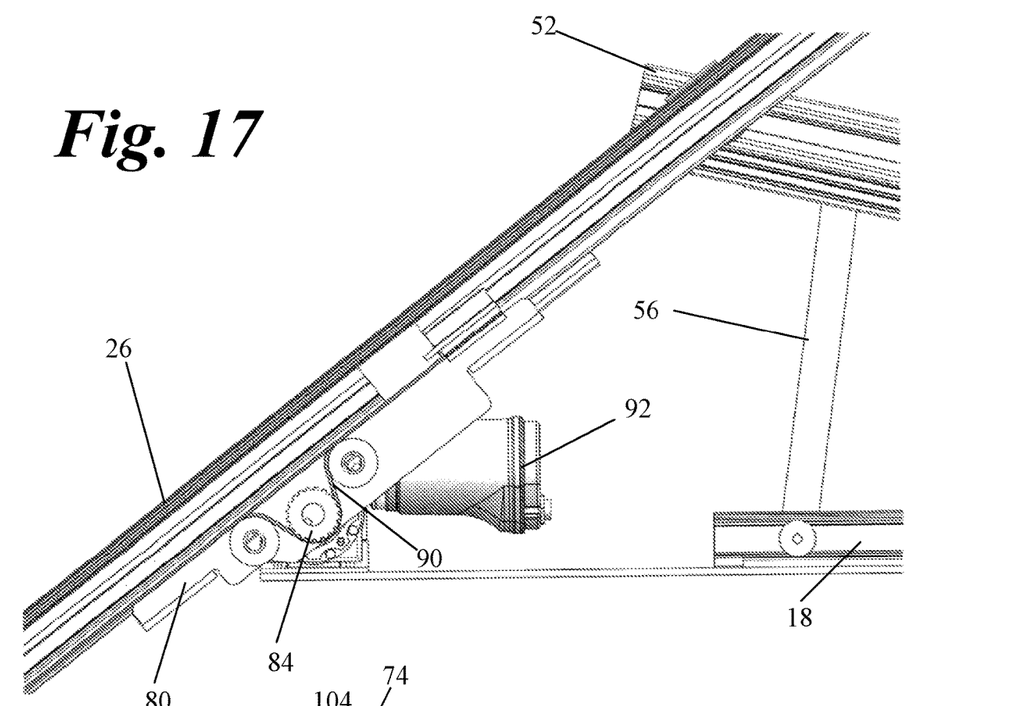
FIG. 17 is a partial side view of the equipment rack of FIG. 1 showing the slide frame assembly in it loading position, a carriage, and the motor, gear train and elongate driven member that cooperate to move the carriage to facilitate movement of the ramp assembly between its loading and stowed positions.
Figure 18:
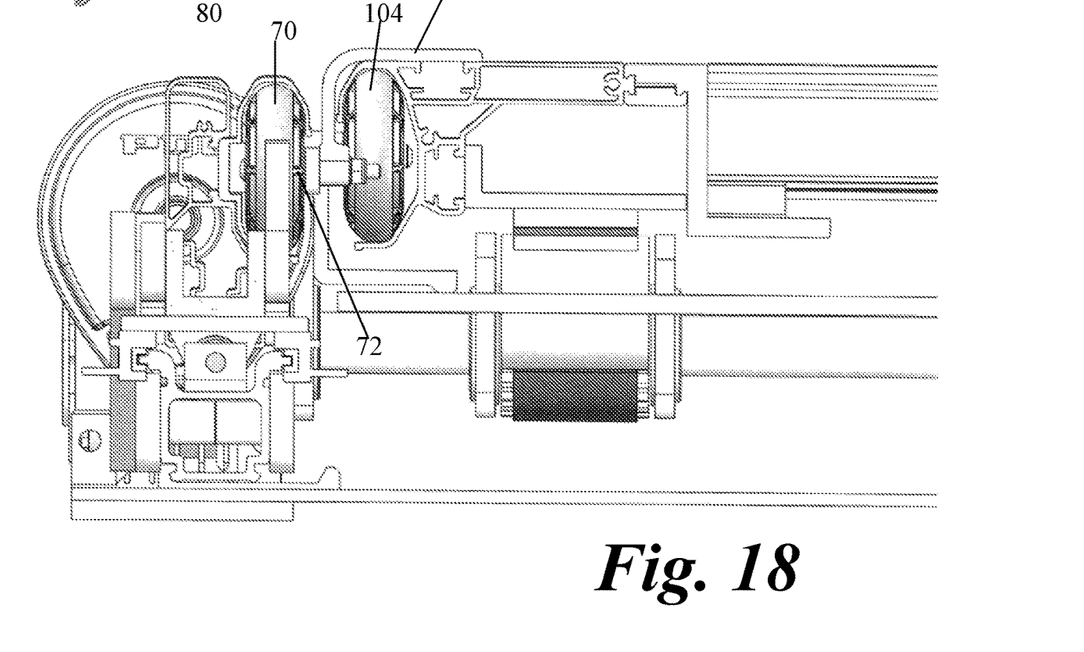
FIG. 18 is a partial front view of the equipment rack of FIG. 1.

The actuator assembly 16 includes a pair of sliders 40 and 42 adapted to ride over and slide relative to the first and second slider guides (channels) 18/20. The first and second sliders 40/42 each have a proximal position shown in FIGS. 2 and 4 and a distal position shown in FIGS. 1 and 3. More specifically, said first slider 40 is adapted to slide along the first slider guide (channel) 18 between the first slider's proximal position and distal position, and the said second slider 42 is adapted to slide along the second slider guide (channel) 20 between the second slider's proximal position and distal position. As shown in FIGS. 2, 4, 5 and 11, the actuator assembly 16 may also include springs 44 and 46 positioned in the slider guides (channels) 18 and 20. Such springs 44 and 46 are coupled at one end to an L-bracket 48 attached to the slider guide (channel) and at another end to a descending element 50 of the slider. When such springs 44 and 46 are provided, they bias the sliders 40 and 42 toward their proximal positions. As shown in FIG. 11, the spring is ideally a gas spring and further acts to reduce (dampen) any shock as the slide frame assembly 14 is moved between the loading and stowed positions.

The actuator assembly 16 also includes first and second ramp guides 52 and 54. The first ramp guide 52 is pivotally coupled to the first slider 40 and to a first end 58 of a first arm 56. The second end 60 of the first arm 56 is pivotally coupled to the first slider guide 18. Similarly, the second ramp guide 54 is pivotally coupled to the second slider 42 and to a first end 64 of a second arm 62. The second end 66 of the second arm 62 is pivotally coupled to the second slider guide 20. The ramp guides 52 and 54 are each adapted to receive guide wheels 70. More specifically, a first guide wheel 70 resides in the first ramp guide 52. This guide wheel is adapted for rotation within the first ramp guide 52 about a pin 72 coupled to the first elongate guide member 26 of the slide frame assembly 14 at a first predetermined position by a bracket 74. The second guide wheel 70 likewise resides, and is adapted for rotation, within the second ramp guide 54. The second guide wheel 70 rotates about a pin 72 which is coupled to the second elongate guide member 28 of the slide frame assembly 14 at a second predetermined position by another such bracket 74.

First and second carriage roller guides (carriages) 80/82 are also provided as a part of the carriage assembly 16. The first carriage roller guide 80 is adapted for reciprocating motion relative to the first elongate guide member 26 and the second carriage roller guide 82 is adapted for reciprocating motion relative to said second elongate guide member 28. In the two-motor configuration shown in the drawings, the carriage assembly 16 comprises one or plural gear trains 84. Each gear train may also be provided with a pair of idlers 86 and 88. Each of the gear trains 84 has an output gear adapted to cooperate with an elongate driven member 90. Each elongate driven members 90 may be in the form of a linear gear or tooth belt or a chain like a timing belt or timing chain. The first shown elongate driven member 90 has opposing end portions coupled to the slide frame assembly, and more specifically the first elongate guide member 26 of slide frame assembly 14. The second shown elongate driven member 90 has opposing end portions coupled to the slide frame assembly, and more specifically the second elongate guide member 28 of the slide frame assembly 14. The first shown elongate driven member 90 is adapted to mesh with the output gear of gear train 84 of carriage 80 and said second elongate driven member is adapted to mesh with output gear of gear train 84 of the carriage 82. As shown, the gears of the gear trains 84 of the carriages 80/82 are caused to rotate by the keyed shaft driven by motors 92 and 94.

The first and second motors 92/94 are each coupled to the base assembly. The motors 92 and 94 are operatively coupled to the gear trains 84 of carriage 80 and 82 and are adapted to selectively rotate these gear trains so that its output gears are able to rotate in both a first direction and a second direction. Rotation of the output gears of gear trains 84 in the first direction causes the slide frame assembly 14 to move into a stowed position, and rotation of the output gears of gear trains 84 in the second direction moves the ramp assembly 14 into a loading position.

Additional features may be provided to ensure smooth operation of the equipment rack 10. For example, stops 100 and 102 may be provided to ensure the guide wheels 70 control the sliders position to distal and proximal positions as needed, and not exit the ramp guides 52/54. The carriages 80/82 may be provided with slide wheels 104/106 to ensure the slide frame travel smoothly as the motors 92/94 operate to turn the gear trains 84. A suitable controller (not shown) will typically be provided to turn the motors on and off and spin in the appropriate direction depending on whether the slide frame assembly 14 is to be moved from the stowed position to the loading position or from the loading position to the stowed position. Locks (not shown) may also be provided to hold the ramp assembly in the stowed position. Many suitable locks are well-known to those of ordinary skill in the art. In some cases, a single-motor configuration may be sufficient. In such cases, one of the motors and the gear train, idlers, and elongate driven member on one side of the rack may all be eliminated.

Operation of the rack will now be described. First, the motors 92/94 are operated to move the slide frame assembly 14 from the stowed position shown in FIGS. 1 and 3 to the loading position shown in FIGS. 2 and 4. More specifically, the spinning motors cooperate to extend the slide frame assembly 14 proximally. As such extension commences, the pressure exerted on the springs 44/46 is released permitting the sliders 40/42 to also move proximally resulting in the proximal end of the ramp guides 52/54 also raising up. As the motors 92/94 continue to operate the slide frame assembly 14 both tilts and its proximal end descends in a controlled manner until the slide frame assembly 14 assumes its loading position. The motors 92/94 are then stopped.

In the loading position, the slide frame assembly 14 is at an angle of between 20 and 70 degrees relative to the ground and to the base assembly. This angle allows long ladders 1/2, long stiff hose sections 3-6 and other equipment to be leaned against the slide frame assembly 14. Such equipment may be fastened to the slide frame assembly using bungee cords, clamps, and other devices well-known in the art.

When loading of the slide frame assembly 14 with the desired equipment is complete, the motors 92/94 are operated to spin the gear trains 84 of the carriages 80/82 so the output gears spin in the opposite direction. Initially, this serves to lift the slide frame assembly 14 until the slide frame assembly 14 reaches its tipping point and the slide frame assembly 14 assumes a position parallel to the ground and base assembly 12 above the base assembly 12. Continued operation of the motors 92/94 exerts forces sufficient of overcome the force of the springs 44/46 allowing the sliders 40/42 to move distally thereby pulling the ramp guides 52/54 down and the allowing the slide frame assembly 14 to also move distally until the slide frame assembly 14 is in the stowed position.

One skilled in the art will recognize from the disclosure provided herein that various modifications may be made without deviating from the invention. This disclosure is not intended to the limiting. The following claims are intended to define the scope of the invention and are to be afforded the full range of equivalents.

The invention claimed is:

1. An equipment rack comprising a base assembly having a first channel and a second channel, a slide frame assembly having a first elongate guide member and a second elongate guide member, a carriage assembly adapted for reciprocating motion relative to the first and second elongate guide members and having output gears, and an actuator assembly, said actuator assembly comprising:
   a. first and second sliders each having a proximal position and a distal position, said first slider adapted to slide along the first channel between the first slider's proximal position and distal position, said second slider adapted to slide along the second channel between the second slider's proximal position and distal position;
   b. first and second ramp guides, said first ramp guide pivotally coupled to the first slider and to a first end of a first arm, a second end of the first arm pivotally coupled to the first channel, said second ramp guide pivotally coupled to the second slider and to a first end of a second arm, a second end of the second arm pivotally coupled to the second channel;
   c. first and second guide wheels, said first guide wheel residing in the first ramp guide and coupled to the first elongate guide member of the slide frame assembly at a first predetermined position, said second guide wheel residing in the second ramp guide and coupled to the second elongate guide member of the slide frame assembly at a second predetermined position;
   d. an elongate driven member coupled to the slide frame assembly, said elongate driven member adapted to mesh with said output gear; and
   e. a motor coupled to the carriage assembly, said motor operatively coupled to the output gear and adapted to selectively rotate the output gear in a first direction and a second direction, wherein rotation of the output gear in the first direction causes the slide frame assembly to move into a stowed position, and rotation of the output gear in the second direction moves the ramp assembly into a loading position.

2. The equipment rack of claim 1 wherein said elongate driven member is selected from a group consisting of a belt and a chain.

3. The equipment rack of claim 1 further comprising first and second springs, said first spring adapted to bias the first slider toward the first slider's proximal position, said second spring adapted to biasing the second slider toward the second slider's proximal position.

4. The equipment rack of claim 3 wherein said first and second springs are gas springs.

5. The equipment rack of claim 1 wherein the slide frame assembly is above the base assembly when the slide frame assembly is in its stowed position.

6. The equipment rack of claim 1 wherein the slide frame assembly is at an angle of between 20 degrees and 70 degrees relative to the frame assembly when the slide frame assembly is in its loading position.

7. The equipment rack of claim 1 wherein the slide frame assembly has a portion extending below the base assembly when the slide frame assembly is in its loading position.

8. The equipment rack of claim 1 wherein the carriage assembly further comprises a pair of idlers.

9. The equipment rack of claim 1 wherein the motor is an electric motor.

10. The equipment rack of claim 1 further comprising plurality of guide wheel stops associated with each of the first and second ramp guides.

11. The equipment rack of claim 1 wherein the carriage further comprises a plurality of slide wheels.

12. The equipment rack of claim 3 wherein the first spring is mounted within the first channel and the second spring is mounted within the second channel.

13. The equipment rack of claim 1 wherein said base is adapted to be mounted to a fire truck.

14. The equipment rack of claim 1 wherein said slide frame assembly is adapted to carry a plurality of ladders.

15. The equipment rack of claim 14 wherein said slide frame assembly is adapted to carry equipment in addition to said plurality of ladders.

16. An equipment rack comprising a base assembly having a first channel and a second channel, a slide frame assembly having a first elongate member and a second elongate member, and an actuator assembly, said actuator assembly comprising:
- a. first and second sliders each having a proximal position and a distal position, said first slider adapted to slide along the first channel between the first slider's proximal position and distal position, the said second slider adapted to slide along the second channel between the second slider's proximal position and distal position;
- b. first and second springs, said first spring adapted to bias the first slider toward the first slider's proximal position, said second spring adapted to bias the second slider toward the second slider's proximal position;
- c. first and second ramp guides, said first ramp guide pivotally coupled to the first slider and to a first end of a first arm, a second end of the first arm pivotally coupled to the first channel, said second ramp guide pivotally coupled to the second slider and to a first end of a second arm, a second end of the second arm pivotally coupled to the second channel;
- d. first and second guide wheels, said first guide wheel residing in the first ramp guide and coupled to the first elongate member of the slide frame assembly at a first predetermined position, said second guide wheel residing in the second ramp guide and coupled to the second elongate member of the slide frame assembly at a second predetermined position;
- e. first and second carriages, said first carriage adapted for reciprocating motion relative to the first elongate guide member and having a first gear train comprising an output gear, said second carriage adapted for reciprocating motion relative to said second elongate guide member and having a second gear train comprising an output gear;
- f. first and second elongate driven members, each having opposing end portions coupled to the ramp assembly, said first elongate drive member adapted to mesh with the output gear of the first gear train and said second elongate drive member adapted to mesh with the output gear of the second gear train; and
- g. first and second motors each coupled to the frame assembly, said first motor operatively coupled to the output gear of the first gear train and adapted to selectively rotate the output gear of the first gear train in a first direction and a second direction, and said second motor adapted to selectively rotate the output gear of the second gear train in a first direction and a second direction, wherein rotation of the output gears of the first and second gear trains in the first direction causes the slide frame assembly to move into a stowed position, and rotation of the output gears of the first and second gear trains in the second direction moves the slide frame assembly into a loading position.

\* \* \* \* \*